May 30, 1939. R. N. CUNDALL 2,160,060
APPARATUS FOR FILLING BAGS
Original Filed Nov. 2, 1932   2 Sheets-Sheet 1
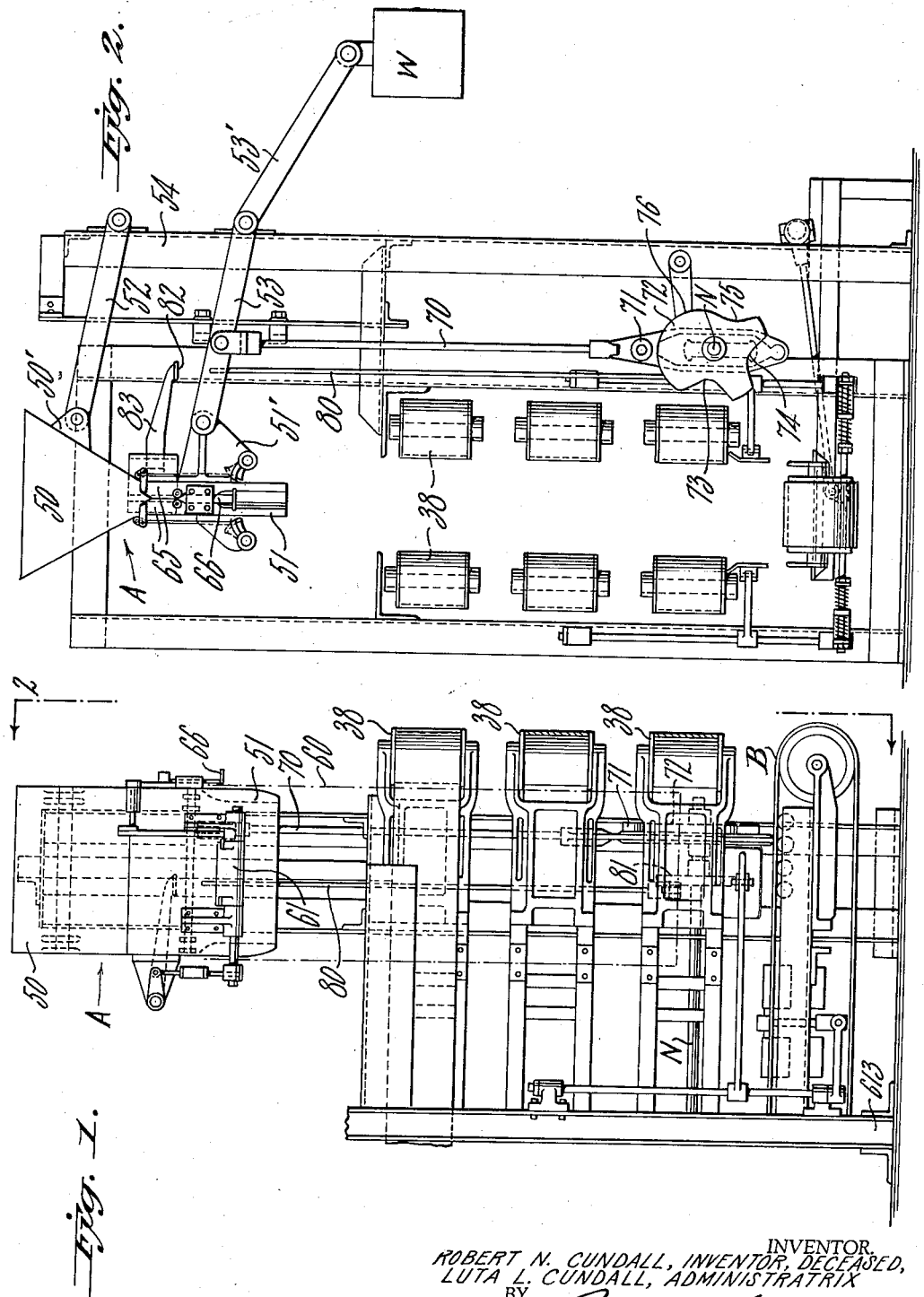
INVENTOR.
ROBERT N. CUNDALL, INVENTOR, DECEASED,
LUTA L. CUNDALL, ADMINISTRATRIX
BY
ATTORNEY.

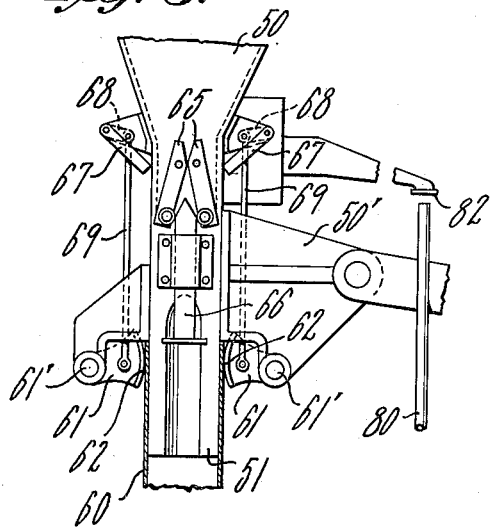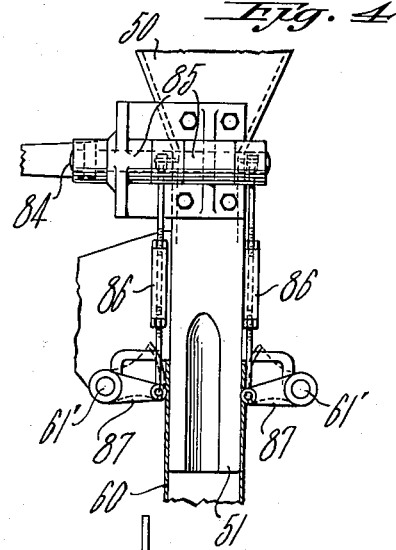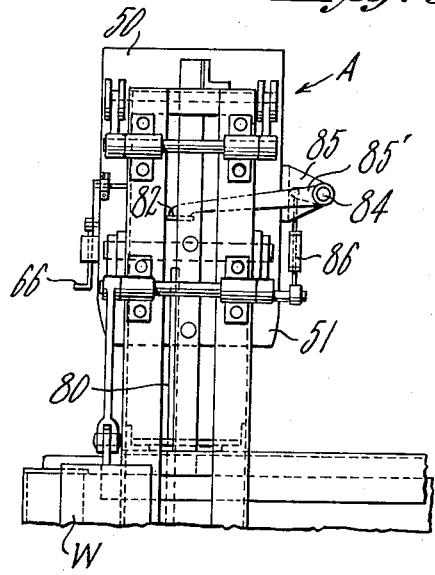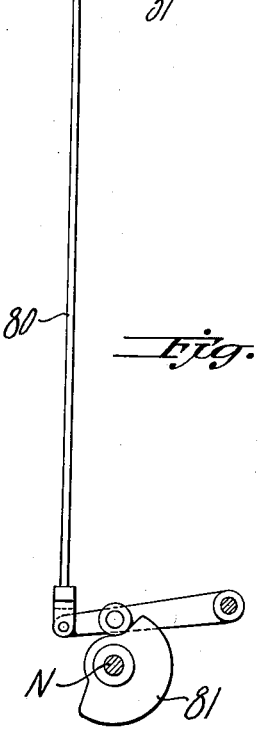

Patented May 30, 1939

2,160,060

UNITED STATES PATENT OFFICE 2,160,060

APPARATUS FOR FILLING BAGS

Robert N. Cundall, deceased, late of Lackawanna, N. Y., by Luta L. Cundall, administratrix, Lackawanna, N. Y., assignor to Bagpak, Inc., New York, N. Y., a corporation of Delaware Original application November 2, 1932, Serial No. 640,758. Divided and this application September 9, 1937, Serial No. 163,045

3 Claims. (Cl. 226—55)

This invention relates to a machine for filling bags such as are used to contain as much as 100 pounds or more of granular or pulverulent materials.

It is therefore an object of the invention to provide apparatus for mechanically accomplishing the purpose set forth. This invention has for further objects numerous improvements in operative advantages and construction, both with respect to the apparatus as a whole and the several portions thereof, as will hereinafter be found to obtain.

The present application constitutes a division of the application, Serial No. 640,758, filed November 2, 1932, for Apparatus for filling, closing, sewing, and sealing bags.

In order that the invention may clearly be set forth and understood, it is described with reference to the drawings accompanying and forming a part of this specification, a preferred form and manner in which it may be embodied.

In these drawings,

Fig. 1 is a front elevation of the improved bag-filling mechanism;

Fig. 2 is an end elevation of the same, taken in the direction of the arrows 2—2 of Fig. 1;

Figs. 3, 4 and 5 are detailed elevational views of the filling spout and mechanism associated therewith at the entering end of the machine; and Fig. 6 is a detail view of apparatus forming a part of my invention as shown in Fig. 1.

Similar reference characters and numerals designate similar parts throughout the several views.

Referring now to the drawings, there is disclosed a filling mechanism indicated generally at A and a conveyor indicated generally at B. Preferably, although not necessarily, the conveyor B is driven in an intermittent manner whereby a period of rest for a period of time sufficient to permit filling of a bag by the filling mechanism is followed by movement of the conveyor to carry the filled bag away from the filling mechanism. Reference is here made to my above-identified application, Serial No. 640,758, for a complete disclosure of a conveyor and drive mechanism therefor which may be used with the filling mechanism hereinafter described.

A shaft N is supported for rotation in suitable bearings and is driven by a motor or other suitable source of power (not shown). As disclosed in said application, Serial No. 640,758, the driving means for the shaft N and conveyor B is so timed in its operation that the conveyor B goes through one complete cycle of operation including a period of rest and a period of motion, as discussed above, while the shaft N performs one complete revolution.

Conveyor belts 38 are driven in unison with the conveyor B and serve to laterally support and assist in the movement of filled bags. It will be understood that the conveyor belts 38 and the conveyor B are supported upon a fixed frame 54 and may extend for any distance necessary to convey the filled bags through any desired number of stations for further processing. Thus, for example, the filled bags may be conveyed through a plurality of stations for closing and sealing the open mouths thereof, as shown in said application, Serial No. 640,758.

The improved bag-filling mechanism includes a hopper 50 terminating in a spout 51. The hopper and spout are integrally joined and have mounted thereon lugs 50' and 51'. Pivoted to the lugs are levers 52 and 53 pivotally secured at their opposite ends to the fixed frame 54. This mounting permits the spout to move vertically, and the weight of the hopper and spout is counterbalanced by a weight W secured at one end of an extension 53' of the arm 53.

A bag 60 is brought up over the spout, as shown in Figs. 3 and 4, with its sides between the spout wall and a pair of clamping members 61. These clamping members are pivotally mounted on shafts 61' and have clamping surfaces 62 eccentric to the shafts 61'. When the clamps 61 are lowered, the clamping surfaces 62 press the bag 60 and hold it against the spout wall. In this condition the weight of the bag and its contents serves to intensify the clamping effect due to the eccentricity of the clamp surface 62. The clamps 61 are initially held in raised position to provide clearance between their gripping surfaces and the spout wall by a pair of latch members 65, and are thus shown in Fig. 2.

As soon as the operator has brought the bag into the requisite position he presses upwardly a member 66 which serves to force apart the lower ends of the latch members 65, thus withdrawing the upper ends of these members from under a pair of cooperating levers 67. The levers 67 support the clamps 61 through cranks 68 and rods 69. Accordingly, when the member 66 is pressed upwardly, with the effect indicated above, the clamps 61 drop and engage the bag.

At this time pulverulent material may be dumped from any suitable device into the hopper 50. The material enters into the bag which is at this time suspended from the spout and the weight of the material tends to overcome the effect of the counterweight W and thus tends to draw the spout downwardly. During this time the conveyor B is stationary but the shaft N is rotating. Pivotally attached to the arm 53 is a rod 70. At the lower end of this rod is a cam follower 71 which, after the bag receives a small amount of material, is caused to bear upon a cam 72 keyed to the shaft N. The cam 72 is provided with cut-away portions or recesses 73, 74 and 75 and with a constant radius portion 76.

With the weight of the hopper plus the weight of the material in the suspended bag overcoming the effect of the counterweight W, rotation of the cam 72 permits follower 71, the rod 70, the arm 53, the hopper 50 and the bag 69 to drop at each of the cut-away portions 73, 74 and 75, thus jogging the bag and causing its contents to settle during the filling operation.

At the time the follower 71 enters the last cutaway portion 75 the spout is in its lowermost position, the bag is full and is resting upon the conveyor B. At this moment a rod 80 (Figs. 2 and 6) actuated by a cam 81 on shaft N is thrust upwardly and strikes the end-face 82 of an arm 83 mounted upon a shaft 84.

The follower 71 bears upon the surface of the cam 72 only when there is sufficient material within the hopper 50 or the bag suspended therefrom to raise the counterweight W, the weight of the empty bag alone being insufficient to raise the counterweight W and lower the hopper 50 and spout 51.

The configuration of the cam 81 is such that the rod 80 is lowered prior to the time when the weight of material in the bag or the hopper 50 causes the latter to descend against the action of the counterweight W, and the raising of the rod 80 normally occurs at the time when the cam follower 71 traverses the cut-away portion 75 of the cam 72; in other words, after the bag has been filled and settled and the hopper 50 and spout 51 are in their lowermost positions, the counterweight W being raised.

Raising the clamping surfaces 62 and releasing the bag from the spout 51 then permits the latter to rise clear of the bag under the action of the counterweight W, the cam follower 71 rising clear of the cam 72, where it remains until the next bag is being filled.

The shaft 84 is journaled in a pair of lugs 85 at the rearward end of the spout of hopper 50. Keyed to the shaft 84 are a pair of crank arms 85' which act through adjustable draw rods 86 and crank arms 87 to turn the shafts 61' and release the clamps 61, thus permitting the spout to rise clear of the bag under the action of the counterweight W. The conveyor B then begins its forward movement to carry the filled bag out from under the spout.

It will be obvious to those skilled in the art that the invention is susceptible of considerable modification in detail without departure therefrom, and the invention is not therefore limited to the specific example or examples given hereinabove by way of illustration, but may variously be embodied within the scope of the claims hereinafter made.

What is claimed is:

1. In a bag-filling device, the combination of a spout adapted to enter the mouth of a bag, a vertically movable clamping device for suspending a bag into the mouth of which said spout has been inserted, a cam, means for rotating said cam, means operatively connected with said clamping device adapted for movement into a position for cooperation with said cam to produce a vertical jogging movement of said clamping device and the bag suspended therefrom as the bag fills, and a device maintaining said last-named means out of cooperative position with said cam until said bag has been filled to an extent sufficient to overcome said last-named device and to move said last-named means into cooperative position with said cam.

2. In a bag-filling device, the combination of a spout adapted to enter the mouth of a bag, a vertically movable clamping device for suspending a bag into the mouth of which said spout has been inserted, a cam, means for rotating said cam, means operatively connected with said clamping device adapted for movement into a position for cooperation with said cam to produce a vertically jogging movement of said clamping device and the bag suspended therefrom as the bag fills, a device maintaining said last-named means out of cooperative position with said cam until said bag has been filled to an extent sufficient to overcome said last-named device and to move said last-named means into cooperative position with said cam, a release for said clamping device, and a second cam adapted to actuate said release to free the bag after it has been subjected to said jogging movement.

3. In a bag-filling device, the combination of a vertically movable spout adapted to enter the mouth of a bag, a clamping device movable with said spout for suspending a bag into the mouth of which said spout has been inserted, a cam, means for rotating said cam, means operatively connected with said clamping device adapted for movement into a position for cooperation with said cam to produce a vertical jogging movement of said clamping device and the bag suspended therefrom as the bag fills, and a counterweight maintaining said last named means out of cooperative position with said cam until said bag has been filled to an extent sufficient to overcome said counterweight and to move said last named means into cooperative position with said cam.

LUTA L. CUNDALL,
*Administratrix of the Estate of Robert N. Cundall, Deceased.*